United States Patent Office 3,176,524
Patented Apr. 6, 1965

3,176,524
INERTIAL NAVIGATION SYSTEM
Helmut W. E. Schlitt, Williamsville, and Walter J. Young, Jr., Tonawanda, N.Y., assignors, by mesne assignments, to Bell Aerospace Corporation, Wheatfield, N.Y., a corporation of Delaware
Filed Dec. 21, 1959, Ser. No. 861,140
19 Claims. (Cl. 74—5.37)

This invention relates to inertial navigation systems, and more specifically to an improved system for use in connection with long term navigation problems such as are encountered for example in connection with the operation of ocean-going vessels, submarines, long range aircraft, and the like. The present invention is particularly applicable to situations wherein no opportunities will occur for external correction of positional information for periods up to months at a time.

It is a primary object of the present invention to provide an improved navigational system as aforesaid which is of vastly improved accuracy over any system presently known.

Another object of the invention is to provide an improved navigational system as aforesaid wherein any tendencies of the gyro component of the system to drift are automatically and constantly nullified, whereby positional errors such as are normally caused by gyro drifting are substantially obviated.

Still another object of the invention is to provide in a navigation system as aforesaid means automatically operable to prevent any noticeable drifting of the gyro component of the system.

Still another object of the invention is to provide an improved navigation system as aforesaid which employs relatively simple and generally standard type components, all of which are readily available on the market, and which are rugged and reliable in operation.

Still another object of the invention is to provide an improved system as aforesaid which may be designed and constructed by employing a relatively minor quantity of additional equipment arranged as accessories to presently known system configurations designed for somewhat similar purposes.

Figure 1:
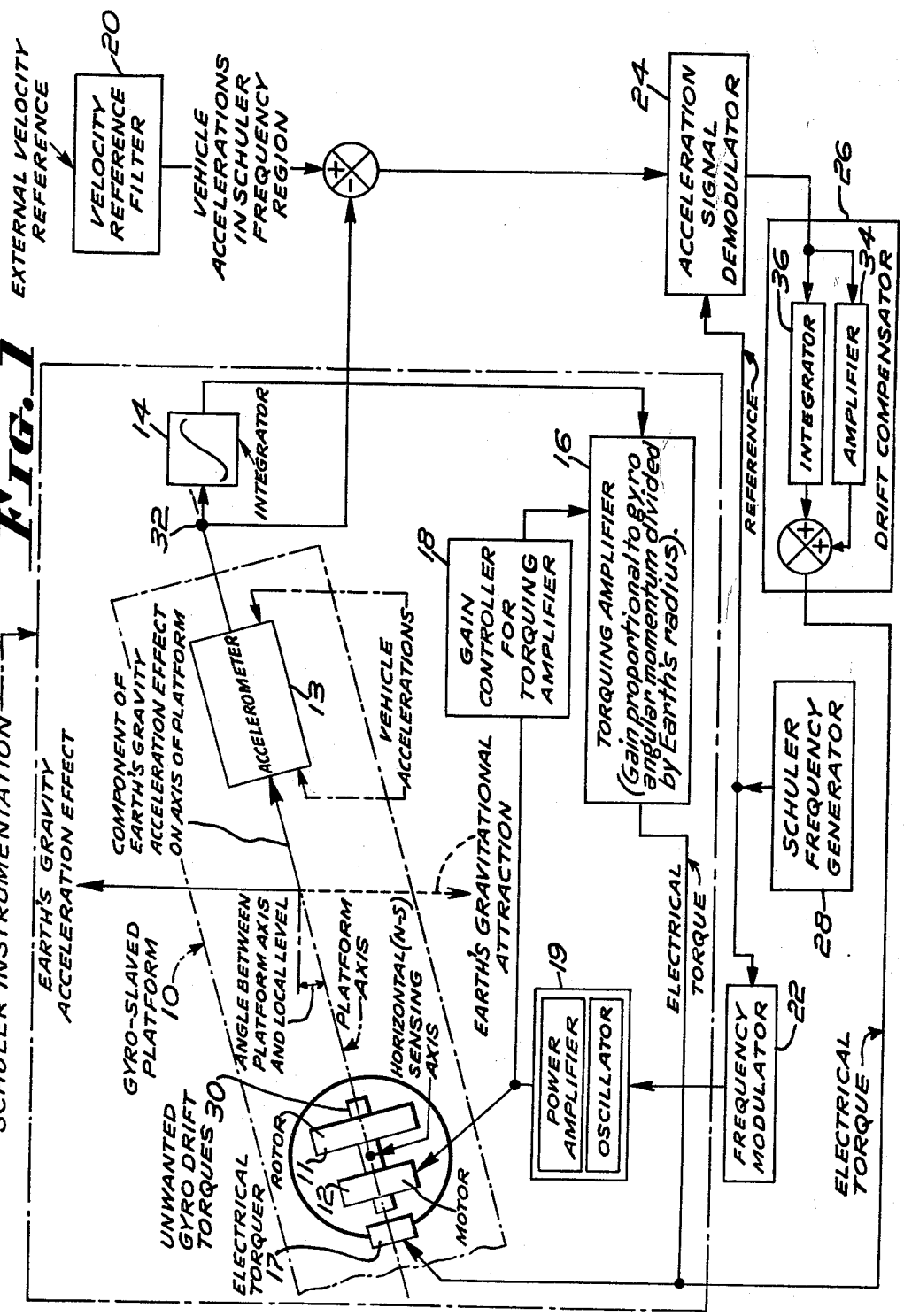
FIGURE 1 is a block diagram showing the improved navigation system utilizing a single axis gyro arrangement.

The invention contemplates broadly an overall navigation system which will prevent error in the position indication output signal. Gyro drift effects such as are normally encountered in prior long time inertial navigator systems are effectively avoided. One example of a sys- of the invention is shown by the block diagram of FIG. 1 furnished herewith, wherein a one-axis portion of the system is shown within the broken line box and comprises a conventional earth radius pendulum or "Schuler loop" as referred to for example in Patent No. 2,835,131, and in the publication "Electronic Equipment," vol. 5, No. 9, Sept. 19, 1957 at pages 42–49. As shown in the drawing herewith this pendulum consists of a platform 10 (shown in side view) slaved to a gyro having rotor 11 driven by a motor 12 and carrying an accelerometer 13 feeding an integrator 14; torquing amplifier 16, feeding electrical torquer 17; gain controller 18; and a gyro spin rate controller 19. The invention comprises addition of accessory devices to the aforesaid conventional Schuler-tuned navigation system; said accessory devices including a velocity reference filter 20; a frequency modulator 22; an acceleration signal demodulator 24; a drift compensator 26, and a generator 28 which is set to deliver a periodic sig-nal at the "Schuler frequency," or at a period of 84.4 minutes. The term "Schuler frequency," as used herein, means the reciprocal of the periodic time for one cycle of Schuler frequency oscillation, i.e., once in 84.4 minutes of time.

Thus the system of the present invention employs a constantly acting periodic change of the gyro angular momentum, which is obtained by constantly varying the frequency of the gyro rotor power supply. Any suitable means may be employed for controlling the degree of gyro spin velocity change in the magnitude of for example within the range of 50% above and below normal operating speed. As shown in the diagram, the oscillator-power amplifier 19 is frequency modulated via the frequency modulator 22 as controlled by the Schuler frequency generator 28, whereby the frequency output of the power amplifier is regulated to change the spin rate of the gyro rotor, and therefore the angular momentum.

The gyro drift torques to be eliminated are shown as being introduced at 30 such as would normally operate to cause unwanted precession of the gyro platform 10. Such torques are unavoidably present in the best known precision gyro instruments and are caused by temperature-induced mass shifts, convection currents in flotation fluid, minute physical instabilities of the gyro structural materials, by vibration effects operating on slight anisoelastic suspension systems, stray magnetic field effects, and so on. The gyro precession rate, caused by such torques, is mathematically equal to the magnitude of the gyro torque divided by the gyro angular momentum. Hence, as the momentum varies, the precession rate varies in inverse proportion. Since the angular momentum of the gyro is being constantly varied at the Schuler frequency, the effects of the gyro drift torques as aforesaid are impressed upon the earth's radius pendulum system at its natural frequency. Since the pendulum portion as seen from this input point, represents an undamped second order system, it responds to such excitation by oscillation at its resonance frequency; the amplitude of which is proportional to the time integral of the applied excitation amplitude.

The feed back loop consisting of the acceleration signal demodulator 24 and the drift compensator 26 picks up this Schuler frequency disturbance from the accelerometer output 32 and feeds it to the demodulator 24. The filter 20 operates to remove any effects of real vehicle motion occurring coincidentally in the region of the Schuler frequency, so that the feed back loop operation will not be affected by these motions. Thus, the demodulator 24 demodulates only the signals resulting from unwanted gyro drift torques. The output of the demodulator is integrated by the drift compensator 26, and the resulting D.C. signal is then applied to the torquer of the gyro. The drift compensator 26 includes an amplifier 34 and a parallel integrator 36. The output of this integrator compensates for the gyro drift torques because its output cannot remain static as long as any input exists from the demodulator 24. The means performance of the entire system is such that the output of the drift compensator integrator substantially compensates for any error inducing gyro torques. In view of constantly changing the angular momentum of the gyro, the gyro torquing amplifier is arranged to have its gain regulated in proportion to gyro angular momentum, for example by adjusting its controller 18 as a function of the output of the gyro spin rate controller 19, as shown schematically in the drawing. This insures operation of the earth's radius pendulum independent of the gyro angular momentum variations.

Whereas only a single horizontal axis system has been described and referred to hereinabove, it will of course be appreciated that the system of the invention may with equal facility involve means for obtaining improved navigational information about additional axes. For example, the system hereinabove described might be arranged to provide information along the so-called "North-South" axis while a relatively perpendicular counterpart system may be arranged to provide improved navigational information along the East-West axis. Then still another somewhat similar system may be arranged to provide improved heading information about a vertical axis transverse to the other two axes. This vertical axis system is illustrated diagrammatically at FIG. 2, and as will be seen therein it is essentially similar to the system of FIG. 1.

Figure 2:
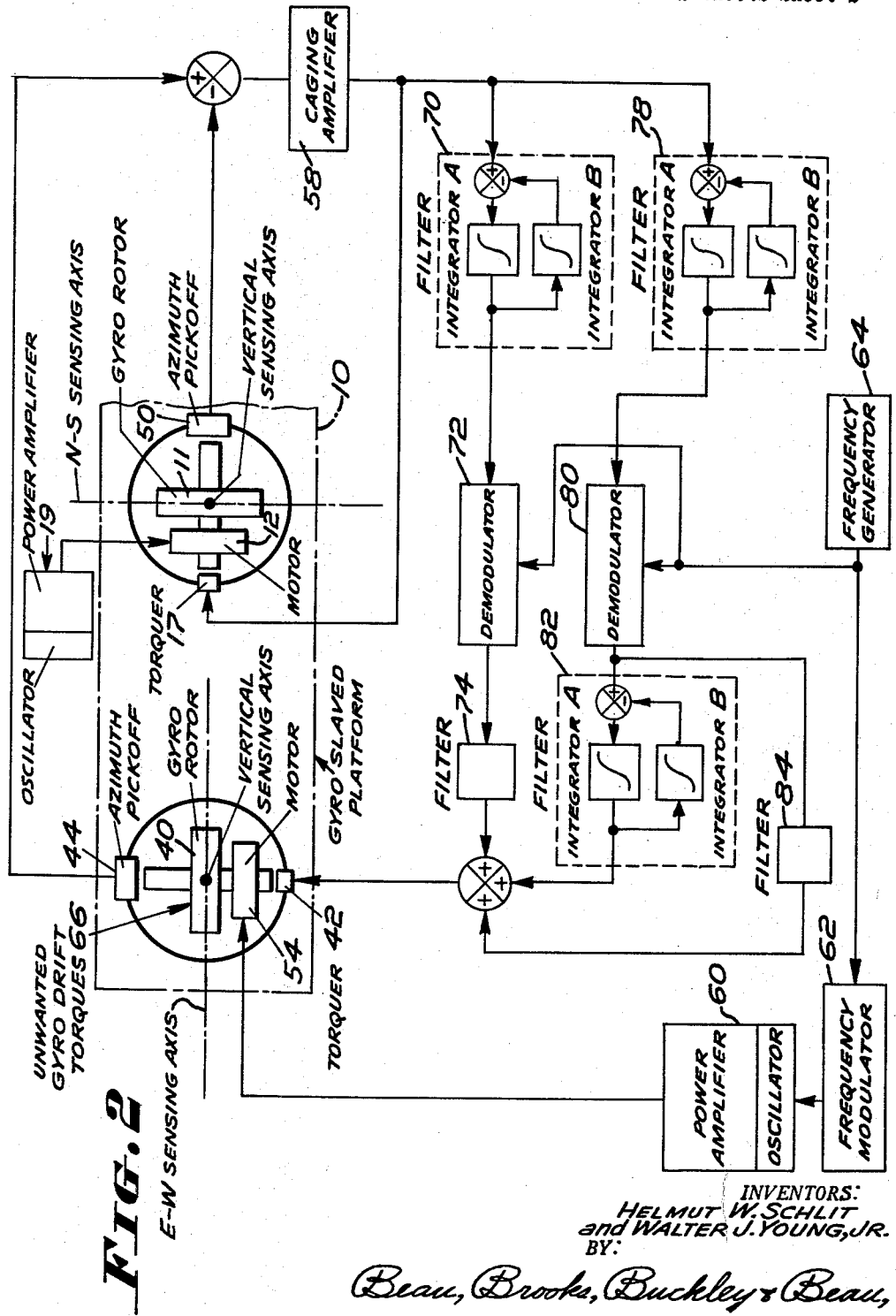
FIGURE 2 is a block diagram showing the improved navigation system utilizing a multiple axis gyro arrangement.

As shown in FIG. 2, the platform system includes two horizontal spin axis gyroscopes having rotors 11 and 40, mounted on the inner element of the gyro-stabilized platform 10; the platform being shown in FIG. 2 as viewed from above. As indicated thereon, each gyroscope contains a horizontal sensing axis as well as a vertical sensing axis. The platform can be controlled in azimuth by reference information about the vertical axis from either gyroscope, but by way of example in the ensuing discussion, control is referenced to gyro 40. The horizontal axes of gyroscopes 40 and 11 are shown arranged for control of the stable element about the East-West axis and the North-South axis, respectively. As hereinbefore described and as illustrated in FIG. 1, the gyros may be drift-compensated about these same axes. FIG. 2 shows how the gyro spin axis modulation technique of the present invention is applied to obtain gyroscope drift-compensation about the vertical or azimuth axis as will now be described in detail.

The azimuth axis caging loop of gyro 11 includes an amplifier 58 which nulls the electrical signal of pickoff 50. This is effected by application to gyro rotor 11 about its North-South axis via gyro torquer 17, of a torque proportional to the pickoff signal. Pickoff 44 of the gyro 40 will be substantially nulled by reason of the fact that the platform control is being referenced to this gyro.

Whereas the azimuth configuration thus far discussed is of a more or less conventional nature, in accordance with the present invention the azimuth axis drift-compensation is effected also by use of a constantly acting periodic change of the gyro angular momentum. As shown schematically in FIG. 2, by way of example the means for changing the gyro momentum may comprise, a power amplifier-oscillator 60; a frequency modulator 62; and a frequency generator 64. The operation of these devices is similar to that described hereinabove except that the modulation frequency employed is not the "Schuler" frequency, as in the case of FIG. 1, but is preferably a higher frequency for example in the region of 10 cycles per hour.

In FIG. 2 the gyro motor 12 is shown to be powered from the oscillator-power amplifier 19 as in FIG. 1 but no modulation of the oscillator is indicated in FIG. 2 because this schematic is concerned only with operation around the vertical axis, and modulation of gyro 11 is not required for the operation of the azimuth correction circuitry. However, modulation of the same gyro is required for operation of correction circuitry around the horizontal axis in the manner previously discussed at the Schuler frequency; and as explained hereinabove a different frequency will be used for the azimuth correction circuits. Satisfactorily independent operation of the compensation circuits is obtained by employing sufficiently different frequencies, say for example by a factor of 10 or more.

The gyro drift torques such as would normally operate to cause unwanted precession of the gyro platform are shown at 66 as being applied to gyro rotor 40. The gyro precession rate caused by these unwanted torques, as heretofore mentioned, is mathematically equal to the magnitude of the gyro torque divided by the gyro angular momentum. Hence as the momentum varies, the precession rate varies in inverse proportion. Since the angular momentum of the gyro is being constantly varied at a selected frequency, the effects of the gyro drift torques as aforesaid are partly manifested as small periodic motions of the platform 10 at a corresponding frequency, and the pickoff 50 will detect these motions. The electrical output of pickoff 50 at the selected frequency is amplified at 58 and enters filter 70. This filter may typically comprise an integrator A with a feed back integrator B; the gain of the feed back integrator being set at the "square" of the selected frequency. Filter 70 is thus tuned to the selected frequency and responds to excitation at this frequency by oscillating. The amplitude of the output oscillation is proportional to the time integral of the applied excitation.

Demodulator 72 receives the growing oscillating signal and converts it into a D.C. zero-frequency signal and feeds it to filter 74. Filter 74 may contain for example an integrator and a low pass network, and functions to integrate the input and remove any high frequency content. Torquer 42 receives this integrated signal from the filter 74, after being summed at 76 with other signals to be subsequently discussed. In operation, the filters 70 and 74 produce integral outputs of their input signals, thus requiring that for "steady state" operation their inputs must be zero. As a result, the periodic input to filter 70 at the selected frequency is reduced to zero by the cancellation of the unwanted torque 66 via torquer 42 and summer 76. Also, as a further result of the closed loop operation, the initial azimuth orientation of the platform is restored after culmination of the torque compensation.

This platform reorientation results because the time integral of the gyro torques must have a value of zero when "steady state" conditions exist. This is true because to achieve a steady state condition the input to filter 74 must be maintained at zero because filter 74 produces an integral output of its input signal. Thus, the filter 70 must deliver no output to the modulator 72 at the selected frequency. The filter 70 puts out no selected frequency signal provided the time integral of the magnitude of the selected frequency input is zero. If the time integral of the magnitude of the selected frequency signal into filter 70 is to be zero, the time integral of the gyro torques must also be zero, since the magnitude of the frequency input to filter 70 is directly proportional to the product of these same torques and the fixed percent spin modulation. Thus, if the outputs of filters 70–72 are held at zero while the system is initially aligned, and if filters 70–72 are then connected and the system allowed to operate, the filters 70–72 will trim the gyro drift and return the system to its original alignment conditions automatically.

It may be noted that any unwanted torques at the selected frequency imposed on the gyro 40 at 66 will effectively produce a zero frequency drift component in gyro 40 as well as a 2nd harmonic frequency drift, neither of which will be detected by filter 70. For this reason the accessory compensation circuitry of FIG. 2 consisting of filters 78, 82 and demodulator 80 may be included in the system. In this case the second harmonic output signal will be introduced into filter 78. Filter 78 is tuned to the second harmonic and provides a second harmonic input to demodulator 80 the magnitude of which is the time integral of the magnitude of the filter 78 input. Demodulator 80 produces at its output a fundamental frequency whose magnitude is proportional to the second harmonic frequency input. The fundamental frequency output is fed to filter 82. Filter 82 is tuned to the fundamental frequency and produces an A.C. integrating action on the fundamental frequency input. This fundamental frequency output is fed to the gyro 40 as a torque via torquer 42, thus cancelling the unwanted fundamental frequency torques. Filter 84 is included to provide adequate damping for the second harmonic feed back loop just discussed.

It will be appreciated that any unwanted torques at the Schuler Frequency imposed on the gyro such as would disturb the compensation circuitries of the horizontal axes may be offset by provision of similar accessory compensation circuits. Also, it will be understood that the compensation technique of the invention as described hereinabove in conjunction with azimuth circuitry, in which a redundant azimuth axis was available, may be employed with equal facility to provide compensation about any axis of angular motion by supplying a redundant reference axis if not otherwise available. The term "redundant axis" as used herein, meaning a gyro sensing axis which is not being used for platform control but which parallels another gyro sensing axis which is being used as a reference for platform control.

Thus, although only a few forms of the invention have been illustrated and described in detail hereinabove, it will be understood that various changes may be made therein without departing from the spirit of the invention or the scope of the following claims.

We claim:

1. A Schuler tuned type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, a variable speed motor connected to drive the rotor of said gyro, and means for periodically varying at the Schuler frequency rate the speed of said motor about a median value.

2. A Schuler tuned type navigating system including a plaform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, a variable speed motor connected to drive the rotor of said gyro, and means for periodically varying at the Schuler frequency rate the speed of said motor about a median value, and a gain controller connected to said means and receiving a signal therefrom varying as a function of gyro rotor angular momentum, the output of said controller regulating the gain of the torquing amplifier.

3. A Schuler tuned type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, a variable speed motor connected to drive the rotor of said gyro, and means for periodically varying at the Schuler frequency rate the speed of said motor about a median value, a gain controller connected to said means and receiving a signal therefrom varying as a function of gyro rotor angular momentum, the output of said controller regulating the gain of the torquing amplifier, an acceleration signal demodulator receiving signals from said accelerometer, and a drift compensation filter consisting of a gain and an electrical integrator and receiving signals from said acceleration signal demodulator and supplying an output signal to said electrical torquer.

4. A Schuler tuned type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, a variable speed motor connected to drive the rotor of said gyro, and means for periodically varying at the Schuler frequency rate the speed of said motor about a median value, a gain controller connected to said means and receiving a signal therefrom varying as a function of gyro rotor angular momentum, the output of said controller regulating the gain of the torquing amplifier, an acceleration signal demodulator receiving signals from said accelerometer, a drift compensation filter consisting of a gain and an electrical integrator and receiving signals from said acceleration signal demodulator and supplying an output signal to said electrical torquer, and a velocity reference filter receiving signals from an external velocity reference device and providing vehicle acceleration signals in the Schuler frequency region to said demodulator.

5. A Schuler tuned type navigating system including a platform, a gyro carried by said platform, an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a variable speed motor, a power supply for said motor including a frequency modulating device, and a Schuler tuned frequency generator coupled to said modulator controlling the latter.

6. An inertial type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a synchronous motor, a power supply for said motor including a frequency modulating device, a frequency generator coupled to said modulator controlling the latter, a demodulator connected to the output of said accelerometer and to the output of said frequency generator, and integrator means connected between the output of said demodulator and the input of said gyro torquer.

7. An inertial type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a synchronous motor, a power supply for said motor including a frequency modulating device, a frequency generator coupled to said modulator controlling the latter, a gain controller receiving a signal from said frequency modulating device varying as a function of gyro rotor angular momentum, the output of said controller regulating the gain of the torquing amplifier, a demodulator connected to the output of said accelerometer and to the output of said frequency generator, and integrator means connected between the output of said demodulator and the input of said gyro torquer.

8. A Schuler tuned type navigating system including a platform, a gyro mounted on said platform, an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a synchronous motor, a power supply for said motor including a frequency modulating device, a Schuler tuned frequency generator coupled to said modulator controlling the latter and a gain controller receiving a signal from said frequency modulating device varying as a function of gyro rotor angular momentum, the output of said controller regulating the gain of the torquing amplifier, an acceleration signal demodulator receiving signals from said accelerometer, a drift compensator including an amplifier and an electrical integrator and receiving signals from said acceleration signal demodulator, and supplying an output signal to said electrical torquer.

9. A Schuler tuned type navigating system including a platform, a gyro and an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a synchronous motor, a power supply for said motor including a frequency modulating device, a Schuler tuned frequency generator coupled to said modulator controlling the latter and a gain controller receiving a signal from said frequency modulating device varying as a function of gyro rotor annular momentum, the output of said controller regulating the gain of the torquing amplifier, an acceleration signal demodulator receiving signals from said accelerometer, a drift compensator including an amplifier and an electric integrator and receiving signals from said acceleration signal demodulator, and supplying an output signal to said electrical torquer, and a velocity reference filter receiving signals from an external reference velocity device and providing vehicle acceleration signals in the Schuler frequency region to said demodulator.

10. A Schuler tuned type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a synchronous motor, a power supply for said motor including a frequency modulating device, a frequency generator coupled to said modulator controlling the latter and a gain controller receiving a signal from said frequency modulating device varying as a function of gyro rotor angular momentum, the output of said controller regulating the gain of the torquing amplifier, an acceleration signal demodulator receiving signals from said accelerometer, a drift compensator including an amplifier and an electrical integrator and receiving signals from said acceleration signal demodulator, and supplying an output signal to said electrical torquer, and a velocity reference filter receiving signals from an external reference velocity device and providing vehicle acceleration signals in the Schuler frequency region to said demodulator.

11. A Schuler tuned type navigating system including a platform, a gyro and an accelerometer mounted on said platform, an integrator receiving acceleration signals from said accelerometer, a gyro torquing amplifier receiving the output signals from said integrator, a gyro torquer coupled to the gyro and receiving signals from said amplifier, said gyro rotor being driven by a synchronous motor, a power supply for said motor including a frequency modulating device, a frequency generator coupled to said modulator controlling the latter and a gain controller receiving a signal from said frequency modulating device varying as a function of gyro rotor angular momentum, the output of said controller regulating the gain of the torquing amplifier, an acceleration signal demodulator receiving signals from said accelerometer, a drift compensator including an amplifier and an electrical integrator and receiving signals from said acceleration signal demodulator, and supplying an output signal to said electrical torquer, and a velocity reference filter receiving signals from an external reference velocity device and providing vehicle acceleration signals in the Schuler frequency region to said demodulator.

12. A Schuler tuned type navigating system including a platform two-degree of freedom gyros mounted on said platform, a pair of accelerometers mounted on said platform, an integrator receiving acceleration signals from each of asid accelerometers, a gyro torquing amplifier receiving the output signals from each of said integrators, a gyro torquer coupled to each gyro and receiving signals from said amplifiers, a variable speed motor connected to drive the rotor of said gyro, and means for periodically varying at the Schuler frequency rate the speed of said motor about a median value.

13. A Schuler tuned type navigating system including a platform, a gyro mounted on said platform and having a rotor, an accelerometer mounted on said platform, an integrator receiving acceleration signals from said accelerometer, a gyro torquing amplifier receiving the output signals from said integrator, a gyro torquer coupled to the gyro and receiving signals from said amplifier, a variable speed motor connected to drive the rotor of said gyro, and means for periodically varying at the Schuler frequency rate the speed of said motor about a median value, and a gain controller receiving a signal from said frequency modulating device varying as a function of gyro rotor angular momentum, the output of said controller regulating the gain of the torquering amplifier.

14. A Schuler tuned type navigating system including a platform, two two-degree of freedom gyros mounted on said platform, two accelerometers mounted on said platform, integrators receiving acceleration signals from said accelerometers, gyro torquing amplifiers receiving the output signals from said integrators, gyro torquers coupled to the respective gyros and receiving signals from said amplifiers, said gyro rotors being driven by synchronous motors, a power supply for said motors including frequency modulating devices, frequency generators coupled to said modulators controlling the latter and gain controllers receiving signals from said frequency modulating devices varying as a function of gyro rotor angular momentum, the output of said controllers regulating the gain of the torquing amplifiers, acceleration signal demodulators receiving signals from said accelerometer, drift compensators including amplifiers and electrical integrators and receiving signals from said acceleration signal demodulators and supplying output signals to said electrical torquers.

15. A Schuler tuned navigating system including a platform, a pair of horizontal-spin-axis two-degree-of-freedom gyros mounted on said platform and each having a rotor, a first gyro acting as a reference for controlling the azimuthal heading of said platform, the second gyro having a redundant axis which is caged by a caging amplifier, said gyro rotors being driven by synchronous motors, power supplies for said motors, a modulating means operating at the Schuler frequency and connected to modulate the power supplies of both motors, a second modulating device operating at a different frequency and connected to modulate the power supply of said first gyro motor only, and a drift compensator consisting of a first filter tuned to said different frequency and receiving input from said caging amplifier, a demodulator referenced to said different frequency and receiving signal from said first filter, a second filter containing an electrical integrator and a "low pass" network and receiving signal from said demodulator, and a torquing device attached to said first gyro and receiving signals from said second filter.

16. A Schuler tuned navigating system including a platform, a pair of horizontal-spin-axis two-degree-of-freedom gyros mounted on said platform and each having a rotor, a first gyro acting as a reference for controlling the azimuthal heading of said platform, the second gyro having a redundant axis which is caged by a caging amplifier, said gyro rotors being driven by synchronous motors, power supplies for said motors, a modulating means operating at the Schuler frequency and connected to modulate the power supplies of both motors, a second modulating device operating at a different frequency and connected to modulate the power supply of said first gyro motor only, and a drift compensator consisting of a first filter tuned to said different frequency and receiving input from said caging amplifier, a demodulator referenced to said different frequency and receiving signal from said first filter, a second filter containing an electrical integrator and a "low pass" network and receiving signal from said demodulator, and a torquing device attached to said first gyro and receiving signals from said second filter, a second drift compensator consisting of a third filter tuned to a frequency which is double the said different frequency and receiving signal from said caging amplifier, a second demodulator reference to said different frequency and receiving a signal from said third filter, a fourth filter tuned to said different frequency and receiving signal from said second demodulator, said torquing device being attached to said first gyro and receiving signals from said fourth filter, and an amplifying and filtering device also receiving signal from said second demodulator, said torquing device receiving signal from said amplifying and filtering device.

17. A navigation system containing a stable element including three two-degree-of-freedom gyroscopes mounted thereon and some three of the axes of said gyros acting as a reference for controlling the stable element about a single axis, each of said gyros having a rotor, said gyro rotors being driven by synchronous motors, power supplies for said motors including frequency modulating devices operable to modulate at different frequencies, caging amplifiers operable to cage the three remaining redundant axes of said gyros, a drift compensator for each of said three stable element axes consisting of a first filter tuned to the frequency chosen for the particular axis and receiving input from said caging amplifier associated with that axis, a first demodulator referenced to said chosen frequency and receiving signal from said first filter, a second filter containing an electrical integrator and a low pass network and receiving signal from said first demodulator, a torquing device attached to the gyro which contains the control sensing axis and receiving signals from said second filter, also a second drift compensator for said three axes consisting of a third filter tuned to a frequency which is twice the said chosen frequency and receiving signal from said caging amplifier, a second demodulator referenced to said chosen frequency and receiving a signal from said third filter, a fourth filter tuned to said chosen frequency and receiving signal from said second demodulator, said torquing device being attached to said reference gyro for said particular axis and receiving signal from said fourth filter, and an amplifying and filtering device also receiving signal from said second demodulator, and said torquing device receiving signal from said amplifying and filtering device.

18. In a navigation system,
a gyro having a rotor,
a plaform slaved to said gyro,
first means on said platform for detecting precessional movements of the platform of a predetermined high frequency,
a second means connected to drive said gyro rotor at a speed continuously varying at said predetermined high frequency so that a drift torque of low frequency which cannot be detected by said first means and which is acting on said gyro imparts precession to said platform which varies cyclically at said predetermined high frequency in accord with the fluctuation of rotational speed of said gyro rotor, and
means connected to the output of said first means and including a torquer acting on said gyro to compensate errors due to drift torque.

19. In a navigation system,
a gyro having a rotor,
a platform slaved to said gyro,
torquer means coupled to said gyro for opposing the effect of drift torque which may be acting upon said gyro to impart a low frequency rate of precession to said platform,
first means mounted on said platform for detecting precessional movements thereof of much higher frequency than the stated low frequency,
second means for imparting, in the presence of low frequency drift torque, an oscillatory precession to said platform which is at said higher frequency,
said second means including mechanism connected to said gyro rotor to continuously vary the rotational speed thereof at said higher frequency, and
means connected to said first means and having an output connected to said torquer means which is proportional to the amplitude of the oscillatory precession of said platform.

References Cited by the Examiner
UNITED STATES PATENTS

| | | | |
|---|---|---|---|
| 2,752,792 | 7/56 | Draper et al. | 74—5.34 |
| 2,786,357 | 3/57 | Quermann et al. | 74—5.7 |
| 2,835,131 | 5/58 | Vacquier et al. | 74—5.37 |
| 2,914,763 | 11/59 | Greenwood et al. | 343—9 |
| 2,941,406 | 6/60 | Singleton et al. | 74—5.37 |

OTHER REFERENCES

"Inertial Guidance," by Philip J. Klass; an exclusive "Aviation Week," special report, 1956, McGraw-Hill Pub. Co.; pp. 7–9 (17 and 18 required).

BROUGHTON G. DURHAM, *Primary Examiner.*

SAMUEL FEINBERG, SAMUEL BOYD, *Examiners.*